United States Patent [19]

Sugitani et al.

[11] Patent Number: 4,704,513

[45] Date of Patent: Nov. 3, 1987

[54] GROOVE TRACING CONTROL METHOD FOR HIGH-SPEED ROTATING ARC FILLET WELDING

[75] Inventors: Yuji Sugitani; Yukio Kobayashi; Masatoshi Murayama, all of Mie, Japan

[73] Assignee: Nippon Kokan Kabushiki Kaisha, Tokyo, Japan

[21] Appl. No.: 855,441

[22] Filed: Apr. 24, 1986

[30] Foreign Application Priority Data

Apr. 30, 1985 [JP] Japan .................................. 60-90994

[51] Int. Cl.⁴ ............................................... B23K 9/12
[52] U.S. Cl. .......................... 219/125.12; 219/124.22; 219/124.34
[58] Field of Search ...................... 219/124.22, 124.34, 219/125.12

[56] References Cited

U.S. PATENT DOCUMENTS 4,587,398 5/1986 Sarugaku et al. .............. 219/124.22

FOREIGN PATENT DOCUMENTS

WO82/01839 6/1982 World Int. Prop. O. ...... 219/125.12

Primary Examiner—Clifford C. Shaw
Attorney, Agent, or Firm—Fleit, Jacobson, Cohn & Price

[57] ABSTRACT

A groove tracing control method for a fillet welding effected by rotating a welding torch and thereby rotating an arc at a high speed. The groove tracing control of the welding torch is effected in accordance with variations in the voltage waveform of the rotating arc and in this way the groove tracing is effected in real time in a noncontact manner with a high degree of accuracy.

1 Claim, 11 Drawing Figures

GROOVE TRACING CONTROL METHOD FOR HIGH-SPEED ROTATING ARC FILLET WELDING

BACKGROUND OF THE INVENTION

The present invention relates to a groove tracing control method for highspeed rotating arc fillet welding.

Generally, the leg lengths of fillet welds of structures have been for the most part less than 10 mm and such fillet welds have frequently been made by high speed welding. As a result, if the aiming position of the arc deviates from the groove line even slightly, a weld defect is caused over a wide area. Therefore, the automatic tracing of a groove by the welding torch is an essential requirement.

SUMMARY OF THE INVENTION

The present invention has been made to meet the foregoing requirements and it is the primary object of the invention to provide a groove tracing control method for high-speed rotating arc fillet welding which is so designed that the characteistics of a rotating arc itself are utilized so as to perform the tracing control of a welding torch in real time with a high degree of accuracy without requiring the use of any detector.

To accomplish the above object, in accordance with the invention there is thus provided a groove tracing control method for high-speed rotating arc fillet welding comprising the steps of: (a) detecting an arc voltage waveform of a rotating arc, (b) dividing the voltage waveform into right and left parts of a given angle ($\phi_o$) ranging from 5° through 90° on both sides of a forward point Cf in the direction of progress of the welding, (c) integrating the divided right and left voltage waveforms and determining an area $S_L$ formed by the left voltage waveform and the left rotation angle ($-\phi_o$ to 0) and an area $S_R$ formed by the right voltage waveform and the right rotation angle (0 to $\phi_o$), (d) computing the difference between the areas $S_L$ and $S_R$ and adjusting a welding torch in a direction perpendicular to the weld line and in the width direction of the welding torch so as to reduce the difference to zero, and (e) computing the sum of the areas $S_L$ and $S_R$ and adjusting the height of the welding torch so as to make the sum equal to a predetermined reference value $S_o$, thereby causing the welding torch to trace the groove.

In accordance with the invention, the voltage waveform of the arc rotating about the axial center of the electrode nozzle is divided into equal parts of a given angle $\phi_o$ on both sides with respect to the direction of progress of the welding and a groove tracing control is performed in accordance with the areas formed by the divided voltage waveforms thereby causing the arc to trace the groove with improved response and high accuracy.

Also, in accordance with the invention, the voltage waveform of the rotating arc is detected and a groove tracing control of the welding torch is performed in accordance with the detected waveform thus making it unnecessary to use any detector for directly detecting the groove and also causing the arc to trace the groove with a high degree of accuracy.

Further, the position of the welding torch is corrected by detecting the position of the arc itself and therefore there is the effect of correcting the position of the arc itself in real time.

The above and other objects as well as advantageous features of the invention will become more clear from the following description taken in conjunction with the drawings.

DESCRIPTION OF THE PREFERRED EMBODIMENTS

In accordance with a welding method of the type which concentrically rotates an electrode nozzle at a high speed so as to rotate an arc, the physical effect of the arc is scattered around with the resulting advantages of the scattered penetration, the formation of a flat bead (curved bead), the improved wire fusing rate due to the rotary centrifugal force and so on and particularly the method can be applied to the welding of small grooves of thick plates to produce satisfactory results.

In accordance with the invention, this high-speed rotating arc fillet welding is applied to a flat horizontal fillet welding.

Figure 9:
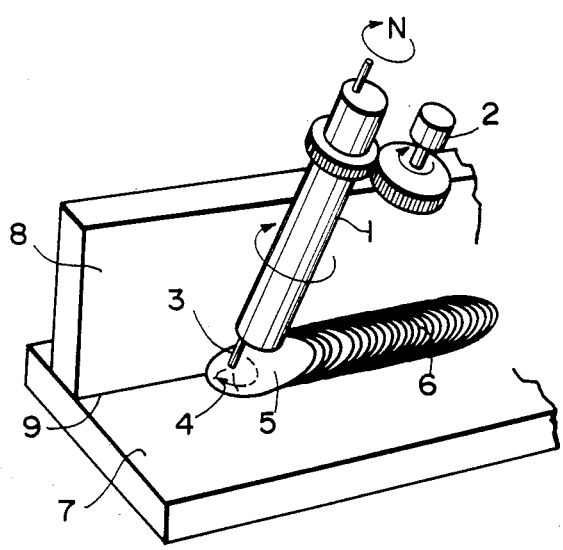
FIG. 9 a perspective view showing an outline of the high-speed rotating arc fillet welding method.

FIG. 9 is a perspective view showing schematically a preferred embodiment of the high-speed rotating arc fillet welding method. In the Figure, numeral 1 designates an electrode nozzle, 2 a drive motor for rotating the electrode nozzle 1, 3 a wire passed through the eccentric hole formed in the energizing tip at the forward end of the electrode nozzle 1, 4 an arc, 5 a molten pool, 6 a weld bead, 7 a lower plate, 8 an upright plate arranged vertically on the lower plate 7, and 9 the root of a groove.

In accordance with this high-speed rotating arc fillet welding method, with the rotation diameter of the forward end of the wire 3 being selected between 1 mm and 6 mm, the electrode nozzle 1 is rotated by the drive motor 2 at a number of revolutions per minute corresponding to the welding current and the welding speed such that the ratio $L_1/L_2$ between an upright plate leg length $L_1$ and a lower plate leg length $L_2$ attains a maximum value and in this way the forward end of the wire 3 is rotated to rotate the arc 4, thus welding the corner of the lower plate 7 and the upright plate 8 along the groove root 9 and thereby producing the weld bead 6 having uniform leg lengths.

Figure 1:
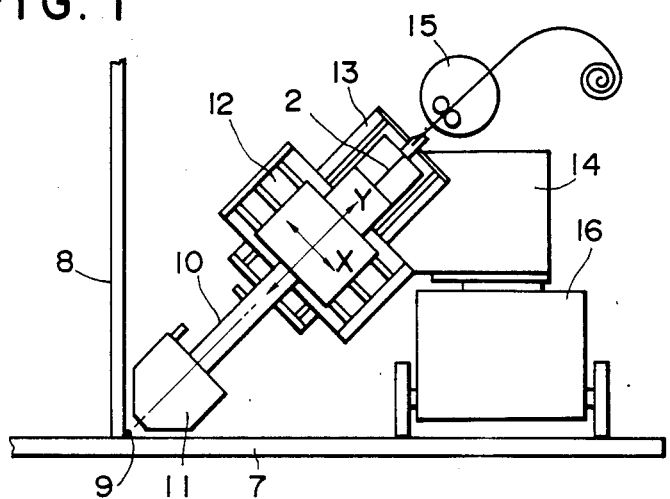
FIG. 1 is a schematic diagram showing a welding apparatus which is used with the invention.

FIG. 1 is a schematic diagram showing the construction of an exemplary welding apparatus for performing the method of the invention and FIG. 1 shows a case in which the axes of tracing are set in the axial direction of a welding torch 10 and the direction of an axis perpendicular to the torch axial direction. In the Figure, numeral 11 designates a gas shielded nozzle incorporating therein an electrode nozzle which is rotated by a drive motor 2, 12 an X-axis tracing mechanism for adjusting the welding torch 10 in an X-axis direction which is perpendicular to a groove root 9, 13 a Y-axis tracing mechanism for adjusting the welding torch 10 in a Y-axis direction or the vertical direction of the welding torch 10, 14 a control unit, 15 a wire feeder, and 16 a carriage.

Figure 2:
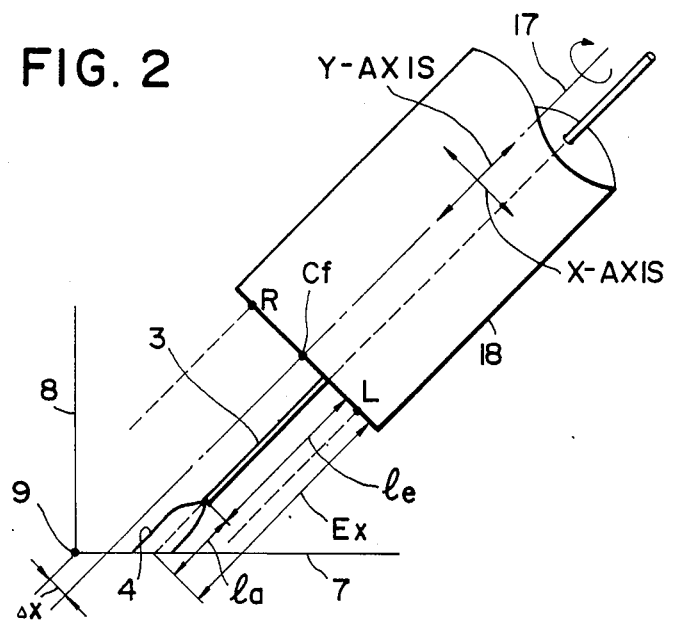
FIG. 2 is an enlarged side view of the welding portion of the apparatus of FIG. 1.

FIG. 2 is a side view of the forward end of the electrode nozzle 1 in a case where the fillet welding is effected by the welding apparatus constructed as described above, that is, a case in which a rotation axis 17 of the electrode nozzle 1 deviates from the groove root 9 by a distance Δx in the X-axis direction. In the Figure, the direction of welding is a direction which is perpendicular to the paper plane and directed from the back surface to the front surface of the paper plane. Designated by $1a$ is the arc length, $L_e$ the wire extension, and $E_x$ the distance between the electrode nozzle 1 and the base metal. Designated by $C_f$, R and L are the positions of the wire 3 during the rotation of the electrode nozzle 1, with $C_f$ showing the forward position of the wire 3 in the direction of welding, R the position of the wire 3 turned to the right by 90 degrees with respect to the direction of welding, and L the position of the wire 3 turned to the left by 90 degrees with respect to the direction of welding.

Figure 3:
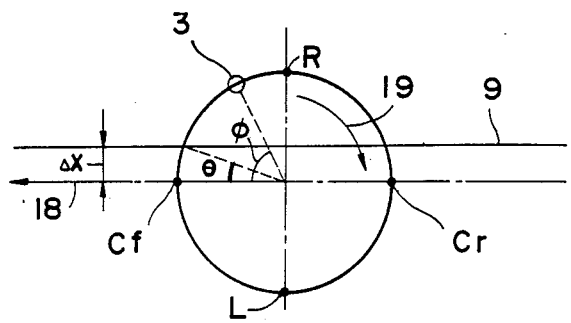
FIG. 3 shows the arrangement of the wire as looked from the direction of the Y axis in FIG. 2.

FIG. 3 illustrates the welding portion shown in FIG. 2 as seen from the direction of the rotation axis 17. In the Figure, designated at $C_r$ is the backward position of the wire 3 with respect to the welding direction 18', 19 the direction of rotation of the wire 3, $\phi$ the rotation angle of the wire 3 relative to the welding direction 18', and $\theta$ the angle at which the position of the wire 3 coincides with the groove root 9.

When the wire 3 is disposed eccentric with the rotation axis 17 of an electrode tip 18 and the electrode tip 18 is rotated about the rotation axis 17, the arc length $L_a$ varies depending on the position of the wire 3 during the tip rotation and the distance $E_x$ between the electrode tip 18 and the base metal also varies. When the distance $E_x$ is varied, the load characteristic is changed thus varying the welding current I and the voltage E between the electrode tip 18 and the base metal (hereinafter referred to as an arc voltage). The welding current I and the arc voltage E vary depending on the characteristics of the welding power source.

Figure 4A:
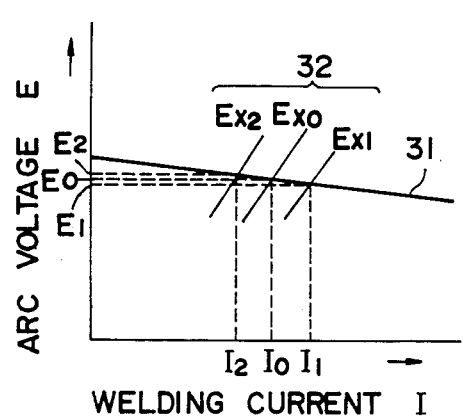
FIG. 4a is a constant voltage characteristic diagram of the welding power source.
Figure 4B:
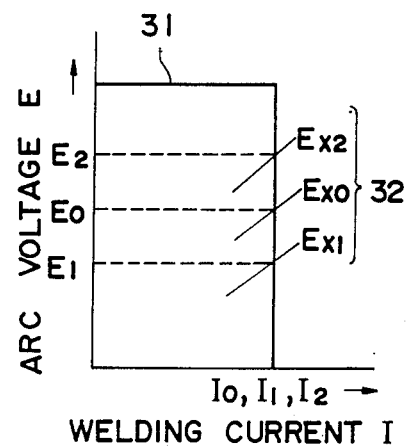
FIG. 4b is a constant current characteristic diagram of the welding power source.

FIGS. 4a and 4b are variation characteristic diagrams of the welding current I and the arc voltage E corresponding to the variation of the distance $E_x$ with the abscissa representing the welding current I and the ordinate representing the arc voltage E. FIG. 4a shows the case where the characteristic of the welding power source is a constant voltage characteristic and FIG. 4b shows the case where the same characteristic is a constant current characteristic. Numeral 31 designates an output characteristic curve of the welding power source, and 32 load characteristic curves varying parallelly in accordance with values $E_{xo}$, $E_{x1}$ and $E_{x2}$, respectively, of the distance $E_x$ as shown in the Figures. The load characteristic curves 32 show the case where $E_{x2} > E_{xo} > E_{x1}$.

The operating point of the arc is at the intersection between the output characteristic curve 31 and each of the load characteristic curves 32 and the welding current I and the arc voltage E at each of these points are determined. In other words, as the distance $E_x$ decreases in the order of $E_{x2}$, $E_{xo}$ and $E_{x1}$, the welding current I and the arc voltage E respectively vary in the order of $I_2$, $E_2$, $I_o$, $E_o$ and $I_1$, $E_1$. In the case of the constant current power source shown in FIG. 4b, there is the relation $I_o = I_1 = I_2$.

The variation of the welding current I or the arc voltage E with the variation of the distance $E_x$ is such that the welding current I or the arc voltage E varies linearly with the distance $E_x$ provided that the variation of the distance $E_x$ is not considerably great. When, in the fillet welding, the electrode tip 18 is rotated as shown in FIG. 2, the distance $E_x$ varies in accordance with the position of the wire 3 with the sine wave as a standard form. It is to be noted that this relation holds not only with consumable electrodes but also with nonconsumable electrodes.

Figure 5A:
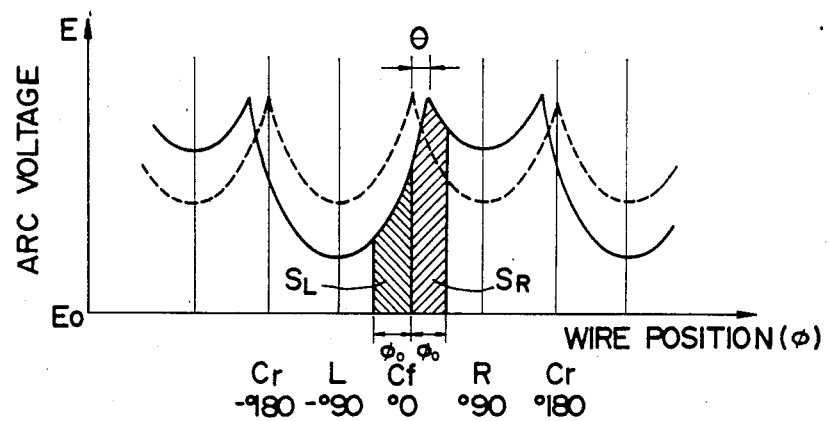
FIG. 5a is an arc voltage waveform diagram.
Figure 5B:
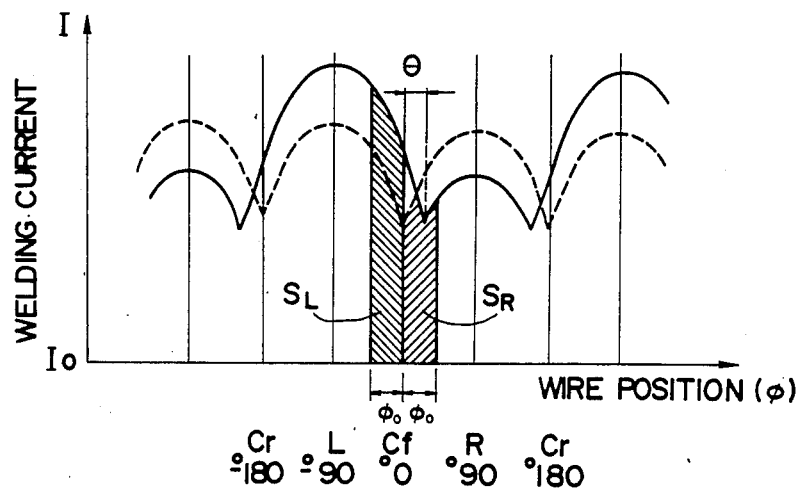
FIG. 5b is a welding current waveform diagram.

FIGS. 5a and 5b show respectively the waveforms of the arc voltage E and the welding current I which vary with the position of the rotating wire 3 or the rotating arc. FIGS. 5a and 5b respectively show the waveforms of the arc voltage E and the welding current I and these waveforms are in the inverted forms. From FIGS. 4a and 4b it will be seen that the waveform of the welding current I shown in FIG. 5b can be obtained only with the welding power source of a constant voltage characteristic and the waveform of the arc voltage E can be obtained with the welding power source having either a constant voltage characteristic or a constant current characteristic.

In FIGS. 5a and 5b, the solid-line waveforms show the cases in which the groove root 9 and the rotation axis 17 of the electrode tip 18 deviate by Δx as shown in FIGS. 2 and 3 and the broken-line waveforms show the cases in which the line connecting the positions $C_f$ and $C_p$ of the wire 3 are brought into coincidence with the groove root 9.

When the groove root 9 and the rotation axis 17 of the electrode tip 18 are not deviating as shown by the broken lines in FIGS. 5a and 5b, the waveform becomes symmetrical on both sides of the position $C_f$ of the wire 3. On the contrary, when the rotation axis 17 deviates from the groove root 9 by Δx, the waveform becomes nonsymmetrical on both sides of the position $C_f$ of the wire 3. This nonsymmetry of the waveform is detected and corrected so as to correct the amount of deviation Δx in the X-axis direction. In other words, the waveform is divided into right and left parts with respect to the direction of welding on both sides of the point $C_f$ and a portion corresponding to a given angle $\phi$ from the point $C_f$ is separated from each of the divided waveforms thereby determining waveform areas $S_L$ and $S_R$ formed by the portions of the angle $\phi_o$. Then, by adjusting the welding torch in the X-axis direction such that the areas $S_L$ and $S_R$ become equal, it is possible to cause the rotation axis 17 coincides with the groove root 9.

In this embodiment, the angle $\phi_o$ is selected between 5° and 90°. If the angle $\phi_o$ exceeds 90° so that it is behind points L and R, respectively, the waveform shown in FIGS. 5a or 5b is distored under the effect of the molten pool and it is impossible to obtain areas $S_L$ and $S_R$ of the accurate waveforms. On the contrary, the shape of the groove is reflected in the waveform more accurately as the position of the wire comes nearer to the point $C_f$. However, if the angle $\phi_o$ is reduced to less than 5°, the waveform tends to be affected by a noise component superimposed thereon. Thus, the range of values of the angle $\phi_o$ is selected as mentioned previously.

Next, a distance control of the welding torch in the vertical direction or the Y-axis direction will be described.

On the basis of the tracing control in the X-axis direction, the sum S of the areas $S_L$ and $S_R$ is determined and the sum S is compared with a reference value $S_o$ thereby controlling the height of the welding torch to reduce the difference $S-S_o$ to zero. The reference value $S_o$ is predetermined in correspondence to the proper value of the height of the welding torch and this may be done by holding in a memory the value of the sum S of the areas obtained when the height of the welding torch is proper. Also, it is assumed that the value of the sum S represents the value obtained by one rotation or integer n rotations of the arc, as follows.

$$S = \sum_{n=1}^{n} (S_L + S_R)$$

Generally, the maximum value of the integer n should properly be selected to be less than the revolutions per minute of the arc.

By correcting the position of the welding torch in the X-axis direction and the Y-axis direction, respectively, in the above-mentioned manner, the tracing for the fillet wedlding is made possible. In this case, while the position correction in the X-axis direction may be effected by detecting the arc voltage E so as to improve the accuracy of waveform detection, the position correction in the Y-axis direction may be effected by either one of the arc voltage E and the welding current I. In other words, the detection of a deviation Δx in the X-axis direction makes it prerequisite that the shapes of the waveform on both sides of the point $C_f$ can be accurately detected as such as shown in FIGS. 5a and 5b and the detection of the arc voltage E is hardly affected by any disturbance noise due to an ac waveform of the commercial frequency or the like. On the contrary, the detection of the welding current I is generally effected by detecting a small voltage drop across the shunt resistor and amplifying it and thus there is the danger of simultaneously amplifying the noise component and distorting the waveform.

On the other hand, the correction of the Y-direction deviation consists of correcting the average deviation of the distance $E_x$ during each rotation of the wire. Thus, in this case, what is important is the value of the sum S of the areas and not the shapes themselves of the waveform. Thus, if the number of rotations n for the calculation of the sum S is selected for example to be about the number of revolutions of the arc or about 1 second, even the detection of the welding current I is practically not subjected to the effect of any noise component.

Figure 6:
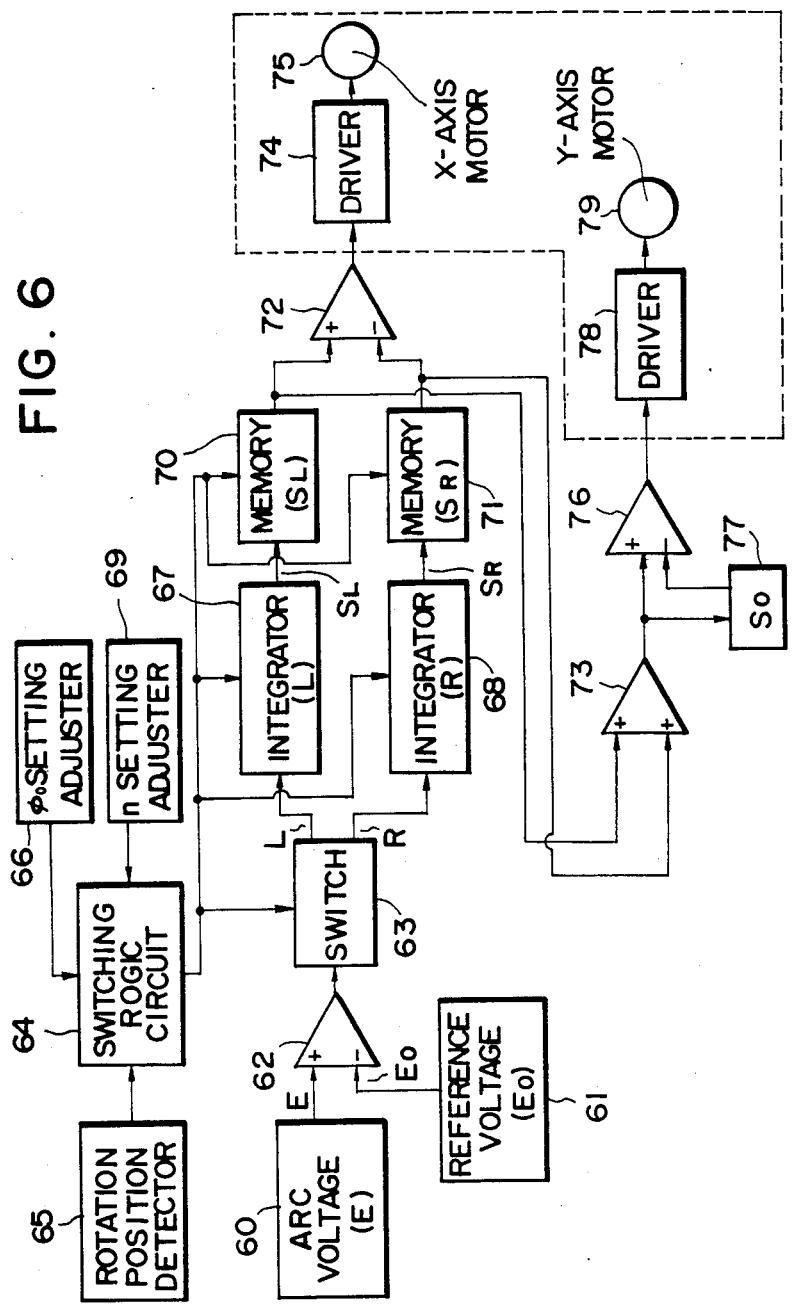
FIG. 6 is a block diagram of the control circuit.

The above-mentioned groove tracing control method will now be described with reference to the block diagram of the control circuit shown in FIG. 6.

First, the arc voltage E is detected by a voltage detector 60 and a differential amplifier 62 determines the difference $E-E_o$ between the arc voltage E and a reference voltage $E_o$ preset in setting means 61 and representing the average value of the arc voltage. The resulting value $E-E_o$ is divided by a switch 63 into L and R parts which are respectively on the left and right sides with respect to the direction of welding. The timing of division by the switch 63 is determined by the command signal from a switching logic circuit 64. The switching logic circuit 64 performs the comparison operation on the rotation angle $\phi$ of the wire 3 detected by a rotation position detector 65 and the output $\phi_o$ of 45°, for example, from a setting adjuster 66 having a preset angle $\phi_o$ ranging from 5° to 90° so that an interval corresponding to the rotation angle of the wire 3 from −45° to 0° is designated as an L interval to generate the waveform of this interval from the L side of the switch 63 and the generated waveform is integrated by an integrator 67. Similarly, the waveform of an R interval corresponding to the wire rotation angle from 0° to 45° is generated from the R side of the switch 63 and it is then integrated by an integrator 68. An n setting adjuster 69 has a preset number n of integration operations so that each of the integrators 67 and 68 integrates the waveform for the n rotations of the arc generated through the switching logic circuit 64 and the resulting outputs $S_L$ and $S_R$ are respectively to memories 70 and 71. The memories 70 and 71 respectively store repeatedly the signals $S_L$ and $S_R$ applied from the integrators 67 and 68 for every n rotation and apply these signals $S_L$ and $S_R$ to a differential amplifier 72 and an adder 73. The differential amplifier 72 determines the difference $S_L-S_R$ of these signals and the resulting value is applied to a driver 74 thus operating an X-axis motor 75 so as to reduce the difference $S_L-S_R$ to zero.

On the other hand, the signals $S_L$ and $S_R$ are combined by the adder 73 and the resulting sum $S_L+S_R$ is applied to one input terminal of a differential amplifier 76. Also, the initial value of $S_L+S_R$ or a value $S_o$ corresponding to the proper welding torch height is stored in a memory 77 and this value is applied to the other input terminal of the differential amplifier 76. The differential amplifier 76 determines the difference $(S_L+S_R)-S_o$ and applies it to a driver 78, thus operating a Y-axis motor 79 and controlling the height of the welding torch in the Y-axis direction.

Figure 7:
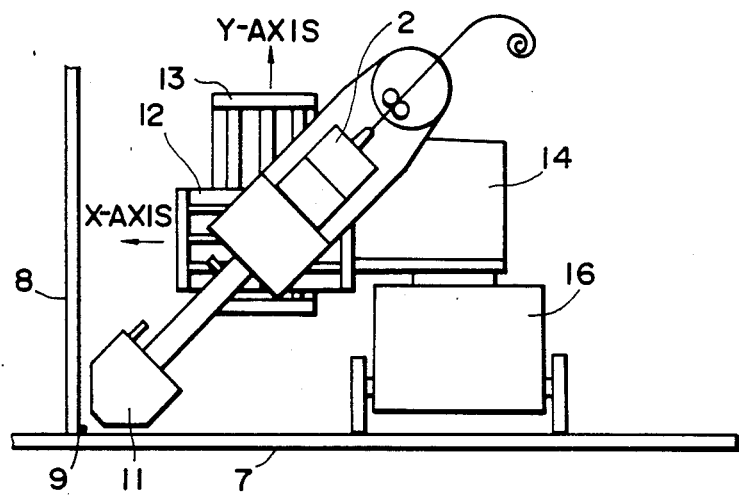
FIG. 7 is a schematic diagram showing the construction of another embodiment of the invention.
Figure 8:
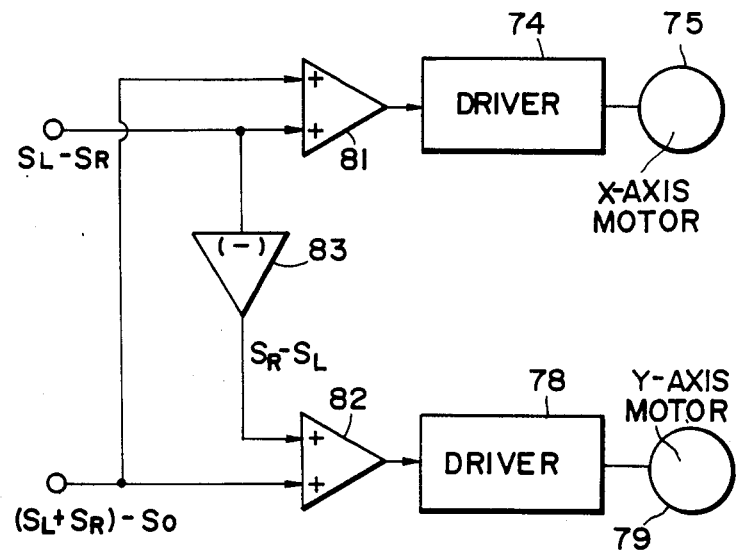
FIG. 8 is a block diagram showing a part of the control circuit in the embodiment shown in FIG. 7.

While, in the above-described embodiment, the tracing axis or the Y-axis direction coincides with the rotation axis of the electrode nozzle as shown in FIG. 1, the groove tracing control can be effected in the like manner as in the above-described embodiment even if the tracing axes are the X axis parallel to the lower plate 7 and the Y axis perpendicular to the X axis as shown in FIG. 7. In this case, as shown in FIG. 8, the X-axis motor 75 and the Y-axis motor 79 are operated by adding adders 81 and 82 and an inverter 83 to the drive circuit shown by the broken line in the block diagram of the control circuit shown in FIG. 6.

What is claimed is:

1. In a high-speed rotating arc fillet welding method for effecting a fillet welding by rotating an electrode nozzle concentrically so as to rotate forward end of a wire passing through said nozzle and thereby rotate an arc, a groove tracing control method comprising the steps of:

(a) detecting an arc voltage waveform of said rotating arc;

(b) dividing said voltage waveform into right and left parts of a predetermined angle ($\phi_o$) ranging from 5° to 90° on both sides of a forward point $C_f$ in a direction of progress of the welding;

(c) integrating said divided right and left parts of said voltage waveform and determining an area $S_L$ formed by said left part and a left rotation angle ($-\phi_o$ to 0) and an area $S_R$ formed by said right part and a right rotation angle (0 to $\phi_o$);

(d) determining a difference between said areas $S_L$ and $S_R$ and adjusting a welding torch in a direction perpendicular to a weld line and in a width direction of said welding torch so as to reduce said difference to zero; and (e) determining a sum of said areas $S_L$ and $S_R$ and adjusting a height of said welding torch in such a manner that said sum becomes equal to a predetermined reference value $S_o$.

* * * * *